United States Patent [19]

Emmons

[11] 4,006,888

[45] Feb. 8, 1977

[54] DRY GRANULAR FEEDER

[76] Inventor: Donald R. Emmons, 2909 Trentwood Blvd., Orlando, Fla. 32809

[22] Filed: Sept. 2, 1975

[21] Appl. No.: 609,288

[52] U.S. Cl. .................................. 259/18; 222/340; 259/4 R

[51] Int. Cl.² ...................... B01F 5/00; G01F 11/06

[58] Field of Search ........................ 259/4 R, 18, 60; 210/62, 138, 169, 205; 222/23, 67, 70, 183, 184, 333, 340, 372, 449, 501, 548

[56] References Cited

UNITED STATES PATENTS

| | | | |
|---|---|---|---|
| 2,307,008 | 1/1943 | Bostick | 259/18 |
| 2,561,696 | 7/1951 | Hammer | 222/449 |
| 2,772,659 | 12/1956 | Tennis | 222/340 X |
| 3,206,069 | 9/1965 | Jacobs et al. | 222/67 X |
| 3,244,407 | 4/1966 | Obergfell et al. | 222/548 X |
| 3,446,403 | 5/1969 | Serio | 222/449 X |
| 3,804,253 | 4/1974 | Wellman et al. | 210/138 X |
| 3,807,700 | 4/1974 | Kennedy | 259/4 R |

*Primary Examiner*—Edward J. McCarthy
*Attorney, Agent, or Firm*—Duckworth, Hobby, Orman, Allen, & Pettis

[57] ABSTRACT

A feeder apparatus for feeding dry, granular material from a barrel into a hopper and from the hopper into a mixing tank has a plunger which accepts small predetermined amounts of material through an opening in the bottom of the hopper, slides to a second position where the material is released into the mixing tank. The plunger is solenoid actuated and has an electronic timing circuit for actuation in a predetermined time sequence for varying the amount of material deposited in the mixing tank.

12 Claims, 5 Drawing Figures

DRY GRANULAR FEEDER

BACKGROUND OF THE INVENTION

The present invention relates to a granular material feeder and especially to a granular chlorine compound feeder for feeding dry chlorine to a tank for mixing with water, such as may be utilized for regulating the chlorine level in swimming pools, water supplies and the like.

In the past, a great variety of chlorinators have been provided for feeding different types of chlorine into water and such devices are commonly used in chlorinating municipal drinking water, and in home and commercial swimming pools for maintaining the chlorine level in the pools. Chlorine is a commonly used disinfectant and bactericide and when maintained at the proper level reduces the microorganism count in the water to a safe level and reduces the growth of unicellular algae and the like. Gaseous chlorine is highly corrosive in the presence of moisture where it hydrolyzes and can form hydrochloric acid so that specially designed feeders for chlorine gas are used to regulate the flow of gas into the water supply. Because of the dangers involved in utilizing compressed chlorine gas, swimming pool operators usually utilize a chlorine compound in which the chlorine is released when the chlorine compound is mixed with water. The chlorine is provided in granular or tablet form as well as in other shapes and may be manually tossed into the swimming pool or other body of water and numerous chlorine feeders have been provided for metering dry chlorine compounds into swimming pools at predetermined rates. Typically, these use specially designed blocks of a dry chlorine compound, with some means of regulating the flow of water through the chlorine feeder, such as jets to gradually dissolve the chlorine in accordance with the flow rate of the water through the feeder. One disadvantage of this type of chlorine feeder is that it requires a specially shaped chlorine and must be reloaded at frequent intervals. One prior art patent has suggested the use of a granular chlorine feeder in which chlorine is fed from a hopper into a receiving tank by means of a rotating screw in which the screw can be rotated at different speeds to feed the chlorine from the hopper where it is dropped into a mixing tank where it is mixed with water and fed to a swimming pool. Inasmuch as the chlorine is dropped in the tank from above the tank, the dry chlorine is never in contact with the moisture until it is dropped in the tank for mixing.

The present invention relates to an improved granular chlorine feeder for feeding dry chlorine into a mixing tank where it is mixed and fed into a swimming pool or other body of water. The chlorine is fed by a reliable mechanism which can be actuated by a timer for maintaining the chlorine level in the swimming pool or alternatively can be controlled by a chlorine monitoring system as set forth in my prior U.S. Pat. Nos. 3,809,922 and 3,836,447.

SUMMARY OF THE INVENTION

The present invention relates to a granular material feeder for feeding a granular chlorine compound into swimming pools and has a frame with a hopper mounted thereto along with a receiving or mixing tank mounted to the frame below the hopper. Granular material loaded in the hopper may be fed by a feeding mechanism into the receiving tank where it is mixed with water from a water source and may be fed back into the water source. The feeding mechanism includes an opening in the bottom of the hopper for the granular material to pass into the feeding mechanism where it is driven by a solenoid actuated plunger to a second opening directly over the receiving or mixing tank. The plunger is intermittently actuated by an adjustable timing mechanism so that the rate of feed is varied by the spacing of the actuation of the plunger from a first position to a second position and back again. The mixing tank includes an inlet water pipe having an exit into the mixing tank to generate a mixing action in the water in the tank and includes a float-actuated valve with a special float guide for shutting off the input of fluid when the water level reaches a predetermined height. A chlorine barrel top allows the placing of a barrel on top of the hopper without spilling the chlorine and a system is provided for determining if the granular chlorine being fed from the barrel has dropped below a predetermined level.

BRIEF DESCRIPTION OF THE DRAWINGS

Other objects, features and advantages of the present invention will be apparent from the written description and the drawings in which.

DESCRIPTION OF THE PREFERRED EMBODIMENT

Figure 1:
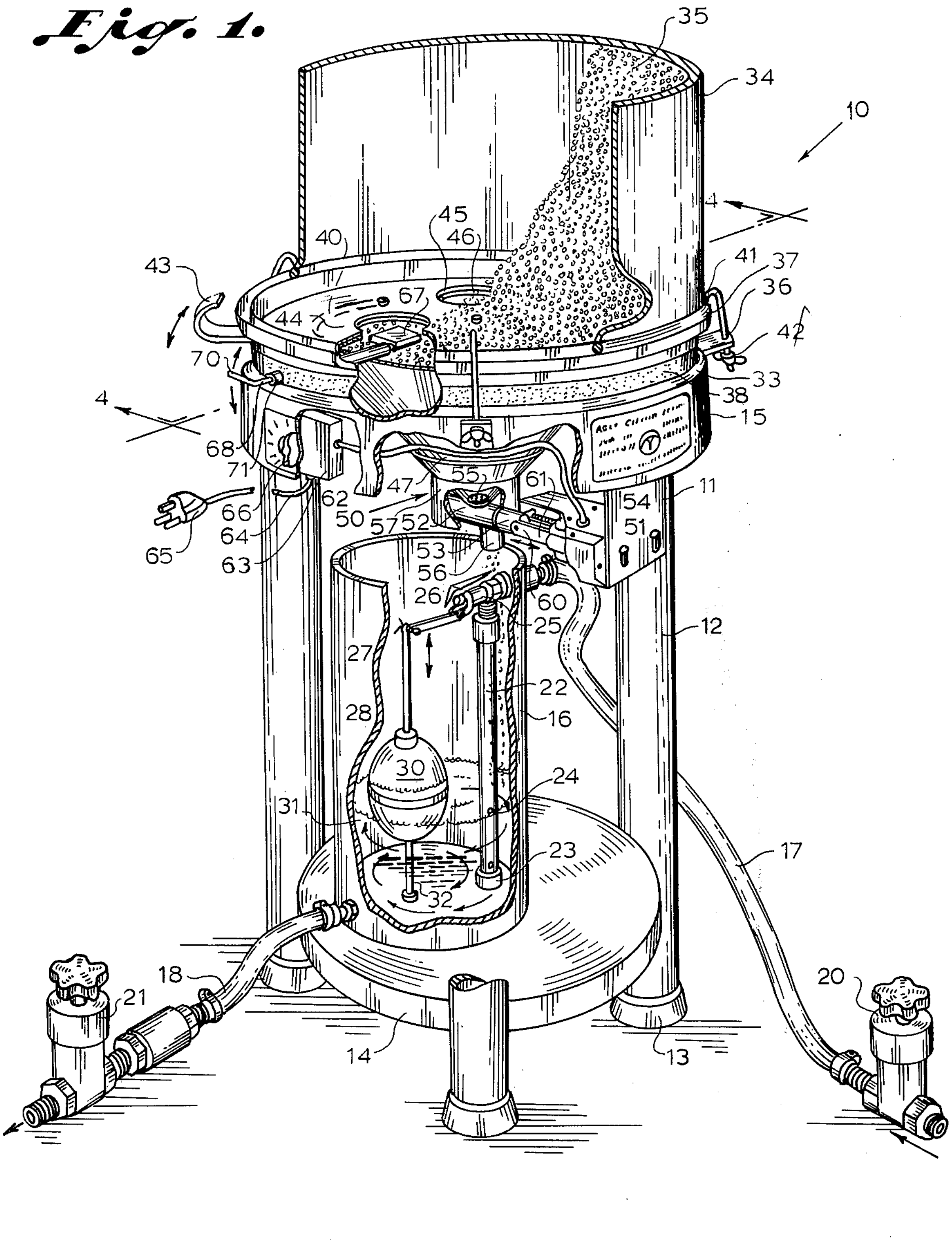
FIG. 1 is a cutaway perspective view of a preferred embodiment of the present invention.

Referring now to the drawings, a preferred embodiment of the invention is illustrated in which the chlorine feeding apparatus 10 has a framework 11 having legs 12. Each leg 12 has a foot 13 and is connected to a frame base member 14 near one end thereof and to a top frame portion 15. The base 14 has a receiving and mixing tank 16 attached thereto with an input line 17 for feeding water or other fluid thereinto and an output line 18. The input line 17 has a shut-off valve 20 while the output line 18 has a shut-off valve 21. Input line 17 has a vertically extending pipe 22 extending toward the bottom of the mixing tank 16 and has a plugged end 23 and a plurality of openings or nozzles 24 aimed in a generally tangential manner along the side of the cylindrical mixing tank 16 so that chlorine dropped into the mixing tank 16 is swirled by the incoming liquid for a more thorough mixing prior to the liquid egressing from the tank through the output line 18. The flow of liquid from the input line 17 is controlled by a float-actuated cutoff valve 25 having an arm 26 pinned by a cotter pin 27 to a vertically extending rod 28. The rod 28 is connected with threads to a float 30 which floats in a liquid 31 to actuate the shut-off valve 25 when the liquid 31 reaches a predetermined level which may be adjusted by varying the length of the rod 28 or by tightening the float 30 further onto the threads on rod 28. A thin, metal rod 32 is attached to the bottom of the mixing chamber 16 and protrudes into an opening in the bottom of the float 31 so that the float 31 may ride up and down with the level of the liquid 31 while being held in position by the rod 32. This prevents the flow of liquid out of the nozzles 24 from pushing the float out of alignment and prevents the float from jamming. Inasmuch as the float always has air trapped therein, the opening for the rod 32 does not prevent the float from floating in the liquid.

As can be seen at this point, if chlorine is dropped into the receiving tank 16, it is mixed by the flow of water through the tank and out of the output line 18. Line 17 can be connected through a swimming pool pump and filter system, drawing water from the swimming pool and returning it to the swimming pool through line 18. The top 33 of the frame 11 has a barrel 34 attached thereto which may be filled with chlorine 35. The barrel 34 is attached with a plurality of brackets 36 which may be threadedly attached between the frame portion 15 and the lid 37 on the barrel 34. The lid 37 is specially designed and replaces the lid that comes on the chlorine barrel 34 so that the barrel may be turned upside down with the sealed lid on the barrel, then locked onto a soft rubber gasket 38 having an opening 40 therein by bracket 36 having hooks 41 and threaded butterfly nuts 42. Once the barrel 34 is placed on top of the frame 11, a rotatably sliding handle 43 can be slid to rotate a sliding door 44 having a plurality of openings 45 therein for alignment with a plurality of openings 46 in the lid 37 to allow the chlorine 35 to pass through the openings 45 and 46 and into a hopper 47. The hopper 47 is mounted to frame 11 top portion 15 and is connected to the feeder mechanism 50. Feeder mechanism 50 is connected to a frame portion 51 of frame 11 and includes a feeding tube 52 having a passageway therethrough with a plunger 53 located to slide therein. Plunger 53 is connected to an electrically actuated solenoid 54 which may slide plunger 53 back and forth intermittently responsive to actuation of the solenoid 54. The feeding tube 52 is connected to the hopper 47 and has an opening 55 from the hopper 47 into the tube 52. Tube 52 also has an output opening 56 located directly over the mixing tank 16 so that chlorine fed through the opening 55 from the hopper 47 into the tube 52 may be moved by the plunger 53 into alignment with the opening 56 where it is dropped into the mixing tank 16. The bottom portion of the hopper 47 has a support frame 57 to support a portion of the granular feeding mechanism 50. The plunger 53 has an opening 58 of predetermined size passing therethrough so that chlorine passing through the opening 55 will enter the opening 58 and the plunger 53 allowing a predetermined amount of chlorine to fill the space 58 while the plunger 53 is in one position and to release the chlorine in the opening 58 when the plunger 53 is aligned in a second position over the exit opening 56. Thus, the rate of actuation of the solenoid 54 sliding the plunger 53 back and forth determines the rate of feed of chlorine from the hopper 47 into the mixing tank 16. The plunger 53 is connected by a pin 60 to the solenoid rod 61. The solenoid is connected by an electrical conductor 62 to a timing mechanism 63 which in turn has an electrical conductor 64 with an electrical plug 65 for connecting to a source of electrical power. The timer 63 has a control knob 66 passing through the top frame portion 15 which is rotated to adjust the intermittent period in which the timer 63 actuates the solenoid 54 and thereby the spacing between the movement of the plunger 53 between positions and the rate of feed of the chlorine into the mixing container 16.

A large barrel 34 may have chlorine 35 continuously fed over a long period of time with a feeder of this type but even so some means is needed to determine when the level of chlorine 35 is getting low in the barrel 34. The present invention advantageously provides a simple mechanical flag 67 which may be made of a noncorrosive metal or plastic and which is connected to a solid rod 68 having a handle 70 thereon. The rod 68 passes through a tube 71, passing through the rubber gasket 38 to a position where it will line up with the openings 45 and 46 into the hopper. Thus, by rotating the handle 70 and the shaft 68, the flag 67 will be rotated in the chlorine 35 producing resistance to the movement of the flag 67. In the absence of chlorine, however, the handle 70 may be easily rotated indicating that the chlorine is dropping below the level of the flag 67 and thus will soon need to be replaced.

Figure 2:
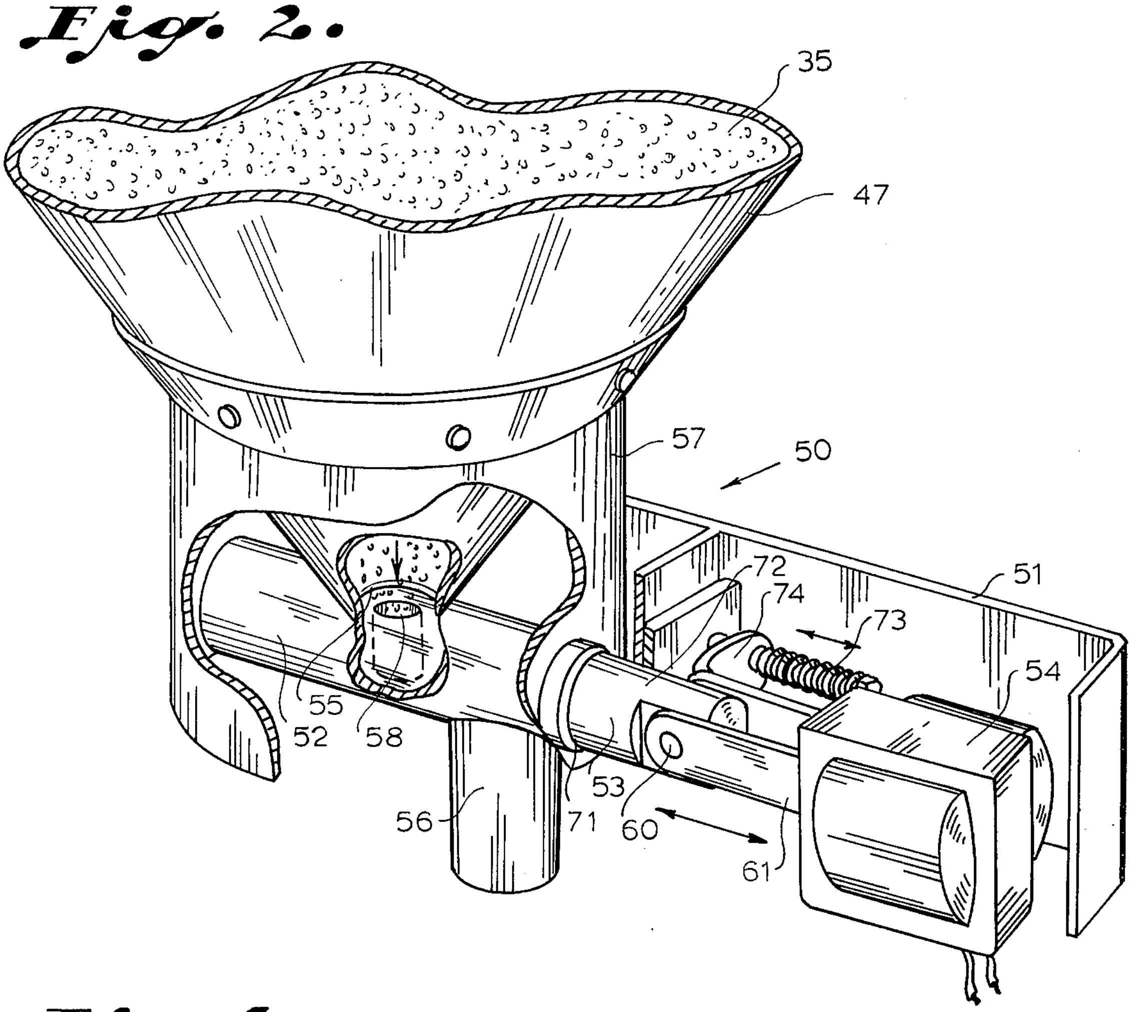
FIG. 2 is a cutaway perspective view of the feed machanism of the embodiment of FIG. 1.
Figure 3:
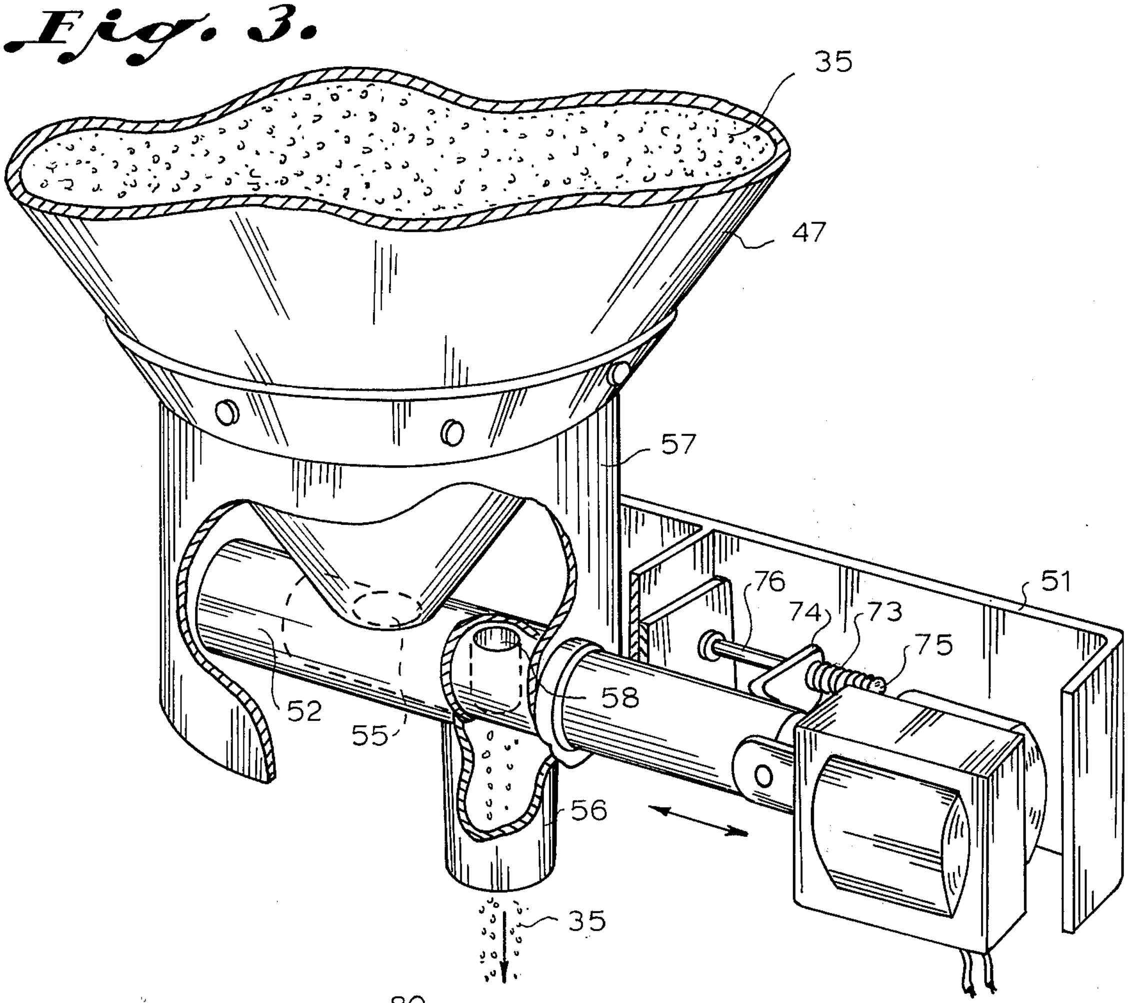
FIG. 3 is a cutaway perspective view of the feed mechanism of FIG. 2 illustrated in a second position.

Turning now to FIGS. 2 and 3, the operation of the feeder mechanism 50 is more clearly illustrated being connected to the hopper 47 filled with chlorine 35 and having the feeder mechanism support frame member 57 attached thereto. The hopper 47 has the opening 55 into the feed tube 52 which has the plunger 53 slidably mounted therein through an opening 71 at the end of the tube 52. An exit tube 56 is mounted to the tube 52 and opens the tube 52 directly over the mixing tank 16 of FIG. 1. Plunger 53 in the present position has the plunger opening 58 which opening passes all the way through the plunger 53 and directly aligns with the opening 55 from the hopper so as to receive chlorine in the opening 58. The frame member 51 is illustrated supporting the solenoid 54 having a driving rod yoke 61 pinned with a pin 60 to the plunger 53 at a plunger tongue 72. Solenoid 54 has a spring 73 connected to a bracket 74 which is connected to the rod 61 for returning the plunger to a first position after being actuated by an electric current driving the solenoid 54. It will of course be clear that other returns other than springs can be utilized and that the spring can be of either a compression or tension type so that the solenoid 54 may push upon actuation or pull when actuated as desired without departing from the spirit and scope of the invention. The solenoid actuates the rod 61 in the present embodiment to slide the opening 58 into alignment with the tube 56 as illustrated in FIG. 3 to drop the chlorine 35 into the mixing tank thereby compressing the spring 73 against the bracket 74 and a spring holding nut 75 attached to the end of a spring holding shaft 76 connected to frame portion 51. The movement of the plunger 53 from the first position as illustrated in FIG. 2, to second position, as illustrated in FIG. 3, delivers the small quantity of chlorine contained in the opening 58 from the hopper 47 to the mixing tank 16 in FIG. 1 and the number of quantities of chlorine varies with the rate of actuation of the solenoid 54 so that larger or smaller quantities can be delivered during a specified time.

Figure 4:
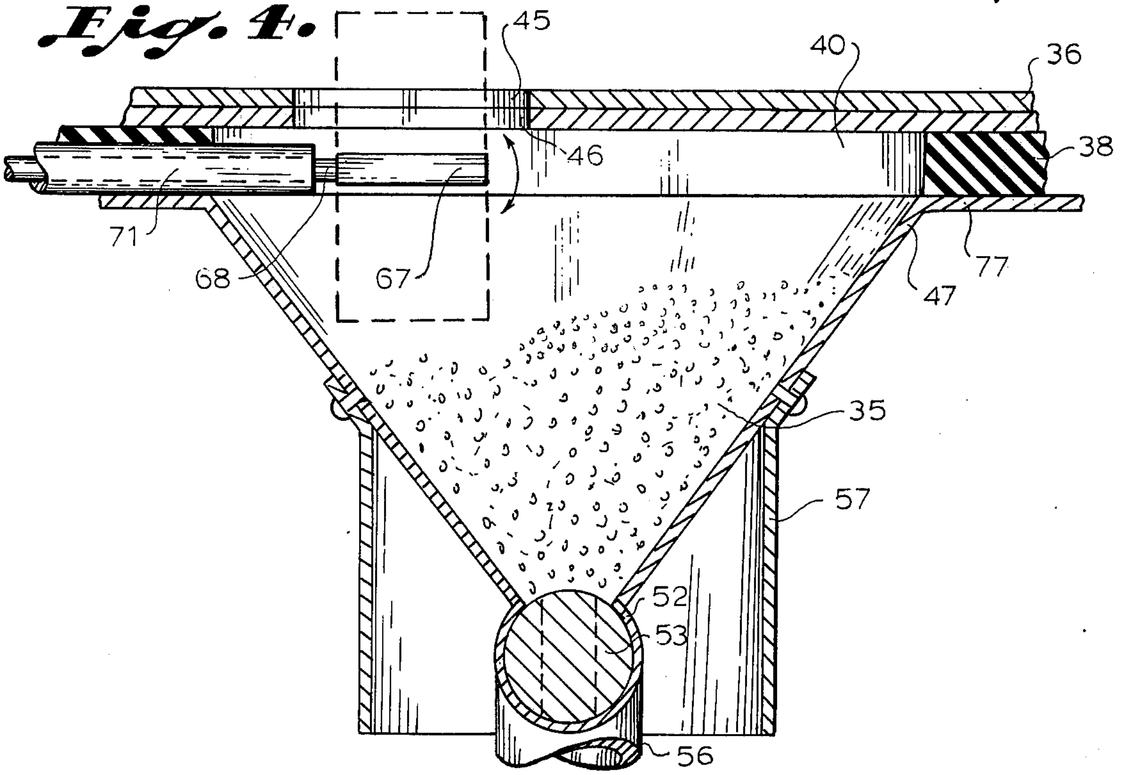
FIG. 4 is a sectional view taken along the line 4—4 of FIG. 1.

Turning now to FIG. 4, the operation of the test flag 67 connected to the shaft 68 is illustrated with the shaft 68 mounted in the tube 71 with the rotation of the flag 67 illustrated with dash lines. The lid 36 is mounted on the gasket 38 having the open space 40 in the middle thereof and the openings 45 and 46 passing through the lid 36 for the passage of chlorine. The tube 71 passes through the gasket 38 which is mounted to the top portion 77 of the hopper 47 which in turn is formed into the top frame portion 15 of the frame 11. Rotation of the shaft 68 rotates the flag 67 which will indicate whether the chlorine 35 is below the level of the flag 67 as illustrated in this figure. The hopper frame portion 57 is illustrated along with the feed tube 52 having the plunger 53 therein and the protruding chlorine drop tube 56.

Figure 5:
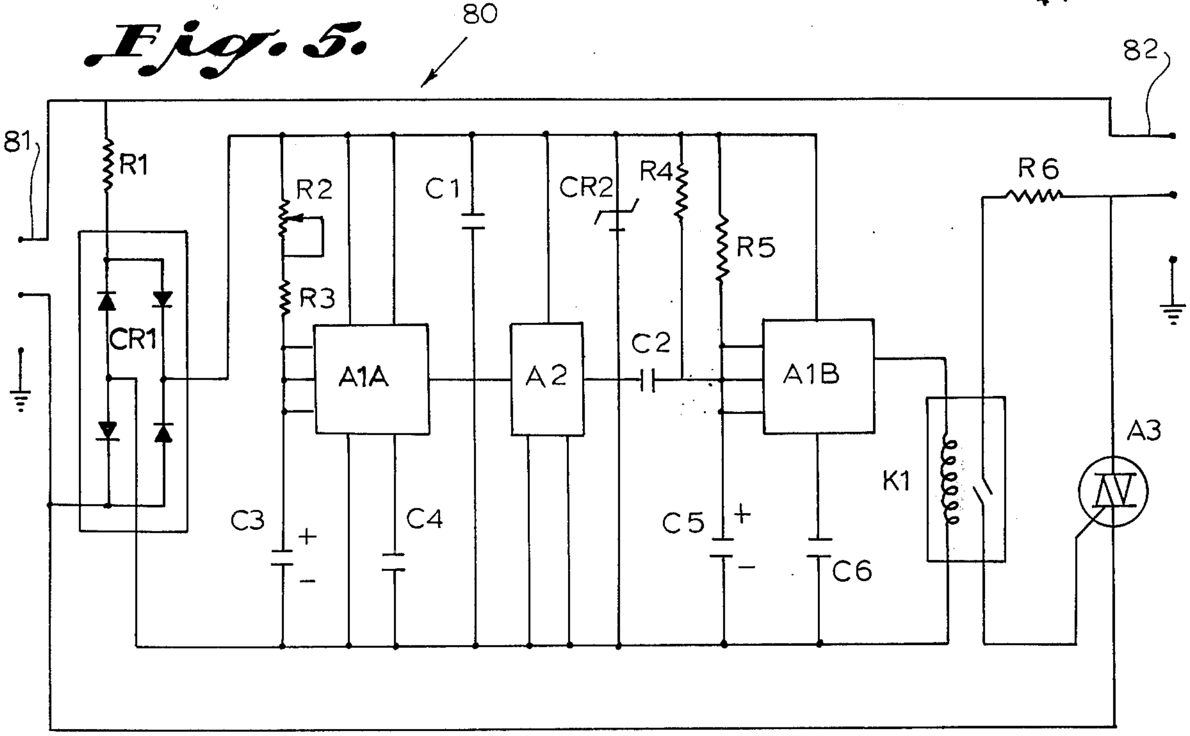
FIG. 5 is a schematic diagram of the preferred embodiment of the timing mechanism for controlling the feed mechanism of the embodiment illustrated in FIGS. 1 through 3.

Turning now to FIG. 5, the electrical circuit is illustrated which is encapsulated in an electronic module and provides a 0.5 second pulse for operating the solenoid 54. This one-half second pulse may be provided in a range from once every eight seconds to once every 30 minutes, thus providing a wide range of chlorine feed. The circuit 80 has a resistor R1 with a plurality of diodes CR1 connected to provide a full wave rectified current source from the input lines 81 to the zener diode CR2 into the capacitor C1 to provide a plus 15 volt DC voltage source to operate the electronics of the module. This power source operates two integrated circuits A1 and integrated circuit A2 along with a triac A3. The logarithmic potentiometer R2 is connected through the knob 66 of FIG. 1 for varying the timing stroke and is connected along with resistor R3 and capacitor C3 to form the time constant elements which provide the eight second to 30 minute time function. The integrated circuit A1A which is functionally one-half of a 556 timer along with the predescribed timer constant elements generates a negative going pulse according to the adjustment of the potentiometer R2 from eight seconds to 30 minutes.

The capacitor C4 attached to the integrated circuit A1A serves only to filter the differential comparator reference and eliminate noisy operation. The negative going output of integrated circuit A1A is digitally divided by 128 by the integrated circuit 82 so that for every 128 inputs to integrated circuit A2 there is only one output. A differentiating network including resistor R4 and capacitor C2 is coupled to the output of the integrated circuit A2 to trigger the input of the integrated circuit A1B which functions as a 0.5 second pulse generator. The 0.5 second time constant is determined by the resistor/capacitance (RC) time constant of resistor R5 and capacitor C5. Capacitor C6 functions to filter the noise from the differential comparator exactly the same as the capacitor C4. The output of integrated circuit A1B operates with a reed relay K1 which functions to isolate the predescribed electronic circuitry from the gate circuit to the triac A3. When the reed relay K1 is operated a current limited by the resistance of resistor R6 is applied to the gating element of the triac A3 which in turn causes the triac A3 to go into its conduction mode. The triac changes to an off mode every half cycle of the 60 cycles appearing across the output solenoid load connected to the output lines 82. However, with each new half cycle, as long as K1 remains closed, the triac A3 will be driven back into its conduction mode. When reed relay J1 ceases to operate at the end of each 0.5 seconds, the reed contacts open and at the end of each one-half cycle the triac will turn itself off (open) and the solenoid in turn returns to its rest position. The following integrated circuits are utilized but it should of course be clear that other circuitry can be utilized without departing from the spirit and scope of the invention: A-1 (A & B)—NE556A (Signetics Corp.); A-2—CD024AE (RCA). In addition, it will of course be clear that other timing circuits which can vary the intermittent actuation of the solenoid 54 can be utilized without departing from the spirit and scope of the invention.

It should be clear at this point that a granular material feeding system has been provided for feeding a large range of rates from a bulk source into a mixing container has been provided. Many of the components of the system may be purchased commercially, but due to the corrosive nature of the chlorine compounds polymers may be used in the framework, and mixing containers, while the hopper 47 may be of spun aluminum impregnated in an epoxy composition to provide the strength necessary to support the weight of the chlorine while providing an inert surface to the chlorine. Similarly, the tube 52 may be made in this manner and the plunger 53 may be of titanium for providing great strength with reduced corrosion from operating in the chlorine, thus providing a long lasting feeding mechanism in a highly corrosive environment. The present feeder advantageously prevents liquid contact with the bulk of the stored chlorine and allows the feeding from a large barrel or source over a long period of time.

This invention is not to be construed as limited to the particular forms disclosed herein since these are to be regarded as illustrative rather than restrictive.

I claim:

1. A granular material feeder comprising in combination;

a frame;

a hopper mounted to said frame;

a receiving tank mounted to said frame and located to receive granular material;

a movable flag rotatably attached to the top portion of said hopper by a shaft extending from said frame whereby rotating of the said shaft will indicate whether said flag is rotating in a granular material; and feeding means for feeding granular material from said hopper to said receiving tank and being operatively connected to said hopper, said feeder means having an opening from said hopper thereinto and having a plunger slidably mounted therein and said feeding means including a path for granular material to move from the opening from said hopper therethrough to said receiving tank responsive to the sliding of said plunger whereby granular material is fed from said hopper to said receiving tank by the sliding of said plunger.

2. The apparatus in accordance with claim 1 in which said hopper has means for attaching a barrel of granular material thereto.

3. The apparatus in accordance with claim 2 in which a barrel is attached over said hopper and includes means for opening a passageway between said barrel and said hopper after mounting said barrel over said hopper.

4. The apparatus in accordance with claim 3 in which a lid placed on said barrel has a slidable portion slidably mounted adjacent a fixed portion and in which the sliding portion has an arm protruding from the lid for rotating the sliding portion to align openings in said sliding portions with openings in the fixed portions of said lid.

5. The apparatus in accordance with claim 1 in which said plunger is made of titanium.

6. The apparatus in accordance with claim 1 in which said hopper is spun aluminum impregnated with an epoxy polymer.

7. The apparatus in accordance with claim 1 in which a soft rubber gasket is located on the top of the frame and has tube passing therethrough rotatably holding said flag rotating rod between said frame and said barrel lid.

8. The apparatus in accordance with claim 1 in which said lid has a plurality of openings to pass said granular material into said hopper.

9. A granular material feeder comprising in combination:

a frame;

a hopper mounted to said frame including means for attaching a barrel of granular material thereover;

a mixing tank mounted to said frame and located to receive granular material from said hopper, said receiving tank having a liquid input and a liquid output and said liquid input being positioned to mix materials in said receiving tank;

feeding means for feeding granular material from said hopper to said receiving tank, and being operatively connected to said hopper, said feeding means having an opening from said hopper thereinto and having a plunger slidably mounted therein, and, said plunger having an opening therethrough of predetermined size and positioned to receive a measured amount of granular material from the opening from said hopper in one position and to drop said material into said mixing tank in a second position, whereby granular material is fed from said hopper to said receiving tank by the sliding of said plunger;

solenoid drive means operatively connected to said plunger for moving said plunger from said first to said second positions when said solenoid is actuated;

solid state electronic timing means being operatively connected to said solenoid for actuating said solenoid for short pulses at predetermined intervals between a range of eight seconds to thirty minutes; and a float actuated valve operatively connected to said input line in said mixing tank for closing said input line responsive to a float rising in the liquid in said mixing tank whereby controlled amounts of granular material are dispensed into the mixing tank, and, mixed therein.

10. The apparatus in accordance with claim 9 in which said input line is connected to nozzles for directing input water at a predetermined angle in said mixing tank.

11. The apparatus in accordance with claim 10 in which a rod is attached to the bottom of said mixing tank and protrudes into an opening in said float for guiding said float during the rise and fall of liquid in said mixing container.

12. The apparatus in accordance with claim 9 in which said solenoid includes a spring return following actuation by an electrical pulse.

* * * * *